United States Patent Office 3,336,979
Patented Aug. 22, 1967

3,336,979
COMPOSITION AND USE THEREOF FOR
WATER SHUT-OFF
Joe B. Ingraham, Sand Springs, and Daniel L. Gibson and
Clare H. Kucera, Tulsa, Okla., assignors to The Dow
Chemical Company, Midland, Mich., a corporation of
Delaware
No Drawing. Filed July 26, 1965, Ser. No. 475,004
16 Claims. (Cl. 166—33)

The invention relates to lessening or inhibiting the passage of water or aqueous solutions through channels, fissures, fractures, and passageways in terranean and subterranean strata.

The invention embodies a method of plugging off encroaching water through fissures or fractures, either natural or induced, extending into water or brine zones from an oil- or gas-bearing zone; of inhibiting water or brine intrusion into excavations, e.g. those associated with construction of foundations for buildings, dams, reservoirs, tunnels, mine shafts, and wellbores; of inhibiting loss of water from earthen reservoirs for storage of water or brine, stock watering ponds, irrigation canals, and ditches; of providing subsurface protection prior to paving airfields, parkways, roadways, and prior to grouting; to inhibit lost circulation during well drilling and well-cementing operations. It also embodies the treatment of soil or sand to render it less permeable to water.

A number of attempts have been made to plug off or inhibit water intrusion or the loss of water through terranean or subterranean strata, including emplacement of hydraulic cements, settable resins, swellable gums in suspension, and chemicals independently injected which form a precipitate upon contact with each other. A need exists for such plugging agent and method of use.

The invention has special application to alleviating problems associated with fracturing. A normally successful method of stimulating the flow of oil from subterranean oil-bearing strata comprises inducing passages or fractures therein by injecting a fluid, usually containing a propping agent, down the wellbore and into the strata at pressures sufficient to fracture the formation. The propping agent is usually sand, granulated walnut shells, glass beads, or the like suspended in the fracturing fluid for emplacement in the induced fractures to prevent their closing up after the fracturing pressure has been released. Sometimes the induced fractures extend into water or brine zones adjacent to or near to the oil zone, resulting in an undesirable amount of water or brine being produced with the oil. A fully adequate plugging agent and method of use against intruding or escaping water and brine through cracks and fissures in adjacent or confining strata and of preventing water or brine from such extended fractures from entering into and contaminating the oil being produced are not known. The invention provides an improved composition and method which meets these and related needs.

Broadly the composition of the invention is a mass of discrete particles each of which comprises a hard core nucleus, an interlayer of a colloid-forming, water-dispersible animal protein adhesive, and an outer coating of a water-insoluble water-swellable polymer and method of inhibiting passage of water through the earth either at the surface or below the surface by the use of such a mass of particles.

The hard core nucleus may be of any hard durable granular material of which the following are illustrative: sand (either whole grain or pulverized), crushed, ground, or pulverized nut shell, wood chips, hard non-fusible resin, ceramic, brick, concrete, perlite, limestone or other rock, calcium carbonate, glass or the like of a particle size of between about 4 and 325 mesh, but preferably between about 10 and 200 mesh (U.S. Bureau of Standards Sieve Series).

The adhesive must be of a type that forms a colloid with water, sometimes spoken of as water-soluble, although when admixed with water it does not form a true solution but, instead, forms a colloidal suspension.

Acceptable water-dispersible animal protein adhesives to employ are aqueous dispersions of casein or animal glue of which that commonly referred to as "Le Page's Glue" is illustrative. Casein performs in a manner superior to that of the other animal protein adhesives.

The polymer may be any water-insoluble water-swellable polymer, e.g. cross-linked polyacrylamide, polyurethane, polyvinylmorpholinone, polyoxazolidinone, polyacrylic acid, sulfonated polystyrene, sulfonated polyvinyltoluene, a polymer prepared by reacting a glycol and a diisocyanate. Cross-linked polyacrylamide or the polymerized glycol and diisocyanate are the preferred polymers to employ.

Polyacrylamide, polyvinylmorpholinone, or polyvinylpyrrolidone, may be prepared either by irradiation or by polymerizing the selected monomer together with a cross-linking agent such as a small amount of N,N'-methylenebisacrylamide, divinyl benzene or the like in the presence of a free-radical generating catalyst such as azobisisobutyronitrile, or an organic peroxide or hydroperoxide, or a persulfate or chlorate of sodium, potassium, or ammonium, and more preferably in the presence of a redox catalytic system which consists essentially of both an oxygen-containing catalyst such as the persulfate, peroxide, or chlorate and a reducing agent such as an alkali metal thiosulfate, bisulfate, sulfite, or bisulfite. The cross-linking agent is employed in an amount between about 300 and 5000 parts per million (p.p.m.) based on the weight of the acrylamide monomer.

Either the selected monomer or a previously prepared linear polymer thereof may be used, to effect cross-linking. Polymerization may be either en mass, i.e. without use of a liquid reaction medium, or in an aqueous or lower aliphatic mono-alcohol solution. It is preferable that the cross-linking polymerization be carried out in an aqueous solution of at least about 5 percent concentration. Best results are obtained when a monomer or linear polymer in a concentration of between about 20 and 90 percent in water (and usually between about 25 and 90 percent), by weight of the reaction mixture, is employed. A chemical cross-linking agent is necessary when employing a chemical catalyst and is recommended when employing irradiation. The cross-linking agent is employed in an amount of between about 0.02 and 10.0 percent (preferably between about 0.2 and 5.0 percent), based on the weight of the polymer. A reference which discusses the preparation of a suitable polymer for use in the practice of the invention may be found in U.S. Patent 2,810,716. Cross-linking agents which may be used in preparing the polymer for use in the practice of the invention include any of those set out therein, e.g. column 2, lines 53 to 68. Illustrative thereof are divinyl ether of ethylene glycol, divinyl benzene, and N,N'-methylenebisacrylamide. The chemical catalyst, when employed, may be any of those known as a free-radical catalyst of which water-soluble persulfates, peroxides, $\alpha,\alpha'$-azoisobutyronitrile, and the redox-type catalysts (as above mentioned) are illustrative.

When the cross-linked polymer is prepared by an irradiation technique, between about 0.5 and 15.0 megarads are usually used and preferably between about 0.75 and 3.0 megarads. The extent of irradiation is that which produces a cross-linked polymer, e.g. poly(N-vinylpyrrolidone), or polyacrylamide which is insoluble but swellable in water or aqueous liquids of the nature of underground water and brines.

Care must be exercised in the polymerization to control the extent of cross-linking so as to provide one which is sufficiently cross-linked to be insoluble in water and aqueous liquids but which will still swell on contact with water or brine.

A typical procedure for preparing a cross-linked polymer by irradiation is as follows: an aqueous solution, containing about 50% by weight of N-vinylpyrrolidone, is irradiated with a dose of about 0.805 megarad from about a 3500-curie cobalt-60 source of gamma rays at a dosage rate of about 0.23 megarad/hour. The polymer so made is separated from the reaction medium, dried in an oven for about 8 hours at a temperature of about 120° C. and then ground to a powder such that substantially all will pass through a 100 mesh screen.

As an alternative procedure for preparing the polymer for use in the practice of the invention, 450 grams of N-vinylpyrrolidone, 0.9 gram of $\alpha,\alpha'$-azobisisobutyronitrile (as a catalyst dissolved in 0.45 milliliter of 1-amino-1,2-propanol), 2.25 grams of divinyl ether of diethylene glycol, and 1800 milliliters of water are placed in a suitable container and heated for about 8 hours under a protective blanket of nitrogen at from about 70° to 80° C. The polymer so formed is separated (as by filtration), dried, e.g. by being placed in an oven at between 80° and 120° C., and then ground to a suitable size powder.

Illustrative of another procedure for preparing the polymer useful in the practice of the invention is a combination of the above two procedures which comprises irradiating a monomer, e.g. N-vinylpyrrolidone, together with a cross-linking agent to provide an initiating source of free radicals. As illustrative, a sample of N-vinylpyrrolidone containing 0.5 percent by weight of N,N'-methylenebisacrylamide as cross-linker, is exposed to a dosage of 2.4 megarads gamma radiation from a cobalt-60 source.

A method of preparing a water-swellable, water-insoluble polymer of a polyglycol and a diisocyanate is described in U.S. Patent 3,054,778.

The preparation of polyurethane resins is described in Polyurethanes, by B. A. Dombrow, Reinhold Publishing Company, New York, N.Y (1957).

Methods of processing naturally occurring colloid-producing water-dispersible animal adhesives from natural sources are well known. For example the nature and preparation of casein may be found in Kirk-Othmer Encyclopedia of Chemical Technology, volume 3, pages 225–236. The manner of admixing the water therewith includes any of many mixing techniques. The percent of the dry solid in water may be from about 5% to about 50% by weight.

The invention is carried out by admixing the selected granular material, e.g. 10 to 60 mesh sand with an aqueous solution of the adhesive, e.g. casein in a suitable blender or mixer. The proportions of the granular material and the adhesive are not highly critical but should be such as to wet thoroughly the individual grains of the granular material but not of such an amount as would tend to fill the interstices among the individual grains. It is recommended that the proportions be such that the individual grains be provided with a very thin film of the adhesive material. Although the relative volumes of the fluid adhesive and the granular nuclei to be wetted determine the optimum amounts of each to use, it is often more convenient, after ascertaining such optimum amounts to use fluid measure for the adhesive and weight for the granular material. As illustrative, the amount of a fluid adhesive (such as an 8 to 30%, preferably 10 to 20%, by weight aqueous dispersion of casein) to be employed with a 10 to 60 mesh granular material of a density comparable to sand may be from about 4 to 40 milliliters per 1000 grams of granular material, 8 to 20 milliliters per 1000 grams being more commonly employed, dependent upon the concentration of the adhesive and size and uniformity of the granular particles. Since the polymer is necessarily sensitive to water, it is inadvisable to use a lower concentration of adhesive in the dispersion or a greater amount of the aqueous dispersion of the adhesive than is necessary. When the aqueous dispersion of the adhesive contacts the polymer, it shows some swelling on first contact but when there is not an appreciable excess of water present, the polymer shrinks to substantially its original volume during the early stage of mixing.

After the discrete grains of the granular material have been provided with a thin coating of the adhesive as described in the preceding paragraph, the water-insoluble water-swellable polymer is admixed with the adhesive coated granular material. It is recommended that the polymer be added in one step as nearly all at once as is practical, i.e. the polymer is dumped into the mixture of adhesive coated granular material and all brought into contact with the adhesive-coated granular material rapidly in a minimum of time. Dependent to some extent upon the size of the batch, it is suggested that the time for mixing the polymer with the adhesive coated granular material be not over about 2 or 3 minutes. Rapid mixing lessens the tendency of the polymer to swell when brought into contact with the water component of the aqueous adhesive composition. Prolonged mixing time tends to remove, undesirably, some of the polymer already adhered and in some instances to reduce the size of some of the granular material.

The polymer must be of no greater average particle size than the granular material composing the nuclei. The polymer is usually between about 20 and about 200 mesh, preferably between about 50 and 150 mesh. It is recommended that substantially all of the polymer particles be of a size not substantially greater than about 0.5 that of the granular nuclei and not over about 0.2 the average size of the granular nuceli is often preferred.

The suspension is preferably freshly made because the dry powder is more convenient to store and handle and because such materials in aqueous dispersion are subject to bacterial action and sometimes to putrefaction. To inhibit bacterial action, it is advisable to admix a small but effective bactericide or germicide with the aqueous adhesive, e.g. 0.5 to 1.0% by weight of the aqueous adhesive dispersion, of Dowcide G which is the sodium salt of pentachlorophenol, sometimes called sodium pentachlorophenate. Because such materials as casein tend at times to cake when being admixed with water, the use of an anticaking material is recommended, e.g. a finely pulverized mineral material, e.g. talcum, $CaCO_3$, or silica flour, preferably finer than that which will pass through a 325 mesh sieve, U.S. Bureau of Standards Sieve Series.

The proportions of polymer to the adhesive-coated granular material is not highly critical. There should be sufficient polymer used to provide a complete outer covering for the adhesive-wet granular material, but not more than will adhere on the sites provided by the discrete grains. An excess amount of adhesive may result in the resulting mass lacking adequate porosity to permit free entrance of water and the desired resulting swelling of the polymer. Although between about 1 and about 50 parts of polymer per 100 parts of granular material may be used, between about 2.5 and 5 parts of polymer per 100 of the granular material are more commonly used.

Mixing of the liquid adhesive and the granular material may be accomplished by use of any known mixer, tumbler, or blender, which produces a minimum of shearing action. Mixing should be accomplished as quickly as possible. Accordingly, the granular material and adhesive are all intermixed, e.g. between 1 and 4 minutes, dependent somewhat on the relative amounts of materials, type and rate of rotation of the mixer, and the viscosity of the adhesive. A film of the adhesive is thus provided about the discrete grains. If an anticaking agent and/or bactericide are employed, they are usually conveniently admixed uniformly with the dry adhesive prior to adding the water thereto.

The so coated grains are then admixed with the particulated polymer. Mixing is preferably conducted (as aforesaid) quickly, usually by dumping both the polymer and adhesive coated grains into a blender, as nearly as is feasible, substantially all at once, and mixing quickly, e.g. 1 to 2 minutes. The polymer, upon first contacting the water component of the adhesive, swells, sometimes up to as much as twice its volume but, the water being present in a relatively small amount, is quickly absorbed by the polymer and the polymer shrinks within about a minute to substantially its original volume.

The thus coated granular material, consisting essentially of the hard core grains, adhesive interlayer, and outer polymer layer, is then dried, as by spreading it out in air at room temperature or in an air drier until it is substantially dry. Drying in air is fully satisfactory and is usually sufficiently completed for use within 10 to 45 minutes dependent on ratio of components and extent to which the particles are spread. An air drier is not necessary but may be used. A drying time of 1 to 5 minutes is ample in an air drier of a temperature of 100° F. to 200° F.

The following examples are illustrative of the practice of the invention.

EXAMPLE 1

908 grams of 20–40 mesh sand were admixed with 10 milliliters of a 20% by weight aqueous dispersion of casein (identified in the dry form, as purchased, as Borden Chemical PK–9) in a ribbon blender. The blender was rotated at 120 r.p.m. for 2 minutes. Then 40 grams of the polymer, of a size of between 100 and 200 mesh prepared by copolymerizing polyglycol with tolylene diisocyanate according to U.S. Patent 3,054,778 were admixed therewith. This polymer is water-insoluble and water-swellable. The polymer swelled momentarily when it first came in contact with the aqueous portion of the casein adhesive, but decreased in volume promptly to substantially its original volume. After mixing for one minute, it was removed from the blender and dried at room temperature for 30 minutes. Discrete particles consisting of sand grain nuclei, an interlayer of casein, and an outer coating of polymer resulted.

The polymer-coated sand was then tested as an effective water plug material as follows:

The coated particles were screened employing a 70 mesh screen to remove any polymer which had not adhered to the casein film on the sand. The polymer which had passed through the screen was weighed, found to be less than 2% of the initial weight of polymer used, and was discarded. The coated particles which had been retained on the screen were slurried with kerosene for one minute. A small percent of remaining fines floated to the top and were removed by decanting the kerosene. If desired, this step may be repeated. Sufficient of the kerosene-wet sand was placed in a 24-inch long, 1-inch inside diameter vertical pipe section, open at both ends, and fitted with a 325 mesh screen and a nipple at the bottom thereof, to fill the section. The so filled section was then placed in a test apparatus designed so that brine or water under pressure in a reservoir could be forced to flow under pressure into or through the section packed with the kerosene-wetted polymer-coated sand grains. A gauge was provided in the system so that the pressure of the brine or water, before passing through the coated sand, could be observed. The rate of flow from the sand, if any, is measured, e.g., by collecting it in a graduated cylinder while timing the flow.

The reservoir was filled with a NaCl–CaCl$_2$ brine and 500 pounds per square inch gauge pressure (p.s.i.g.) applied. Water passed through the mass of sand grains coated with polyglycol-tolylene diisocyanate polymer, adhered thereto by casein, as made above, for about 2 minutes, at a markedly decreasing rate (during which the polymer swelled). Thereafter, although pressure at 500 p.s.i.g. was continued to be applied on the reservoir, the flow through the section containing the coated grains dropped to less than 1 milliliter in the 3rd minute and substantially stopped shortly thereafter. This shows, that the mass of polymer-coated granular material, sufficiently stopped the flow of aqueous liquids to serve as a water plug in a crack or fissure containing them.

A second portion of the screened, kerosene-wetted coated sand made above was tested for swelling by placing 15 milliliters thereof in a 50 milliliter (ml.) graduate, tapping gently while adding until it was just even with the 15 ml. mark. 30 ml. of water were then added to the graduate and the contents shaken several times until thorough mixing was attained. The graduate was then set down and the volume of the mass of polymer-coated sand measured after a minute. It was found to occupy 21 ml. representing a swelling of about 30%, i.e. the volume after swelling was 1.3 times the original volume.

For use in the following examples, a polymer was prepared by polymerizing, in a substantially non-oxidizing atmosphere, acrylamide in about a 15% by weight aqueous medium with about 4500 parts of methylenebisacrylamide per million parts of acrylamide, as a cross-linking agent, and employing about 0.5% by weight of monomeric mixture, of potassium persulfate as a catalyst, and separating and pulverizing the polymer so made.

EXAMPLE 2

Example 1 was repeated except that 400 grams of 20–40 mesh ground walnut shell was used instead of the 908 grams of sand and the polymer employed was the crosslinked polyacrylamide prepared as described above. The 400 grams of shell occupied the same volume as the 908 grams of the sand of Example 1. It required 50 grams of the 20% aqueous casein suspension to wet thoroughly the walnut shell (instead of only 10 ml. required in Example 1, due to the greater porosity of the walnut shell). 40 grams of the cross-linked polyacrylamide were employed to coat the walnut shell. The length of stirring when the polymer was added was 3 minutes instead of the 1 minute of Example 1. The so coated walnut shell was then dried as in Example 1.

The efficacy of the coated shells so made to block or shut off the passage of water or brine was tested, employing the method described above. The amount of brine passing therethrough was again less than 1 ml. per minute.

The capacity of the polymer-coated particulate material to swell when contacted with water or brine was also tested as in Example 1. It was found to swell 80%, i.e. the volume within one minute was 1.8 times its original volume.

EXAMPLE 3

Example 2 was repeated except that glass beads, of 20 to 40 mesh size, in an amount sufficient to occupy the same volume as the sand employed in Example 1, were used as the granular nucleus or core material. 10 ml. of the 20% aqueous casein solution were admixed therewith and thereafter 40 grams of the cross-linked polyacrylamide admixed with the casein-coated beads (using only 30 seconds for mixing the polymers with the adhesive wet beads).

The resulting polymer-coated beads were tested for water or brine shut-off and for swelling in contact with water or brine, as in the examples above. The passage of water through the sample of packed coated beads after 2 minutes, as in the previous examples, was less than 1 milliliter per minute. The swelling was over 100%, i.e. the final volume was over twice the original volume.

EXAMPLE 4

Example 2 was repeated except that a weight of 20 to 40 mesh aluminum metal pellets were used as the core or nuclei of the particulate material in an amount sufficient to equal the volume of the sand, walnut shell, or glass beads used in the previous examples. 10 ml. of 20% aqueous casein dispersion were admixed therewith in the same blender employed in the previous examples. 40 grams of the cross-linked polyacrylamide were admixed with the casein coated pellets; the mixing of the polymer was done in one minute.

The pellets, so coated, were tested for water or brine shut-off and for swelling in water or brine, as in the above examples. The flow of brine under 500 p.s.i.g., after 2 minutes to permit wetting and swelling of the polymer, was again reduced to less than 1 ml. per minute. The coated pellets swelled in water 20%, i.e. the final volume was 1.2 times the initial volume.

EXAMPLE 5

Example 2 was again repeated employing substantially the same type and amount of sand and polymer but wherein the polymer was adhered by animal protein glue, commonly known as Le Page's glue, instead of the aqueous casein dispersion. The polymer-coated sand so made was screened and tested for water shut-off as in Example 1. The flow through the testing apparatus at 500 p.s.i.g. after 3 minutes was 13 ml., during the fourth minute, 17 ml. the fifth minute and 16 ml. the sixth minute.

The results, although inferior to those obtained when using casein as the adhesive, indicated marked reduction in water flow which would be acceptable to meet less stringent conditions.

EXAMPLE 6

To illustrate the embodiment of the invention wherein the loss of water or brine from storage in an open pit is desired to be inhibited, the soil from the bottom and sides are scooped up, as by large earth-moving equipment, intermixed with the water-swellable polymer-coated granules of the invention, in an amount sufficient to at least fill the interstitial spaces of the soil as in a sand-cement blender, and the resulting mixture replaced and tamped in the bottom and along the sides of the pit. Upon contact with water the polymer swells and inhibits the passage of water therethrough.

EXAMPLE 7

To inhibit the loss of water or brine through a crack or opening of appreciable size in an otherwise water-tight storage pit, a mass of the water-swellable polymer-coated granules of the invention are packed into the crack or opening and water or brine-wetted to provide a substantially water-tight plug.

Comparative experiments

Example 1 was again repeated employing substantially 908 grams sand and 40 grams of polymer, according to the same procedure as in Example 1 except that instead of the aqueous dispersion of casein, 10 ml. of a 20% aqueous dispersion of each of the following adhesives in a pulverulent state were employed.

(a) Corn starch
(b) Gum tragacanth
(c) Potato starch
(d) Soy bean flour
(e) Hydroxyethyl cellulose
(f) Locust bean gum
(g) Zein, Type A
(h) Methyl cellulose
(i) Guar gum The polymer-coated sand was tested for water shut-off as in Example 1. Three minutes were initially allowed in each test for the polymer coating to become wetted and to swell. Measurement thereafter was the rate of flow during the following three minutes, i.e. 4th, 5th, and 6th minutes.

The table below shows the results obtained for each of the experiments after allowing about 1 minute for the polymer to be wetted.

| Adhesive Employed as Identified by Letters above | Brine through the Mass of Particles, in three successive minutes, Measured in ml. | | |
|---|---|---|---|
| | 4th Minute | 5th Minute | 6th Minute |
| a | 90 | 86 | 82 |
| b | 76 | 54 | 50 |
| c | 53 | 8 | 22 |
| d | 100 | 50 | 50 |
| e | 47 | 48 | (¹) |
| f | >250 | (¹) | |
| g | >250 | (¹) | |
| h | >250 | (¹) | |
| i | >250 | (¹) | |

¹ Not determined.

Reference to the table shows that the adhesive employed is highly critical. It appears to require a specific composite of properties of tackiness, water sensitivity but insolubility and resistance to attrition. Adhesives (a) to (i) above are not satisfactory for the practice of the invention. Casein, and to a lesser extent animal glues, possess the desirable properties for use in the practice of the invention. Comparable results may be obtained by employing other granular nuclei or cores than those in the above examples, e.g. pulverized brick, ceramic, limestone or hardened infusible resins, e.g. epoxy, phenol-formaldehyde, urea-formaldehyde, or melamine. Comparable results may also be obtained by employing other water-swellable polymers, e.g. polyacrylamide, polyvinylpyrrolidone, polyvinylmorpholinone, polystyrene, polyvinyltoluene, or polyurethane.

In fracturing an oil- or gas-bearing stratum overlying a water zone, the invention may also be practiced by conducting a fracturing operation in general substantially as described in the Farris Reissue Patent 23,733 of U.S. Patent 2,596,843, but improved by the use of the improved propping agent of the instant invention which comprises a granular material comprising hard core nuclei to which is adhered, by means of an animal glue or casein, a water-insoluble water-swellable particulated polymer.

The well so fractured, will produce less water per barrel of oil, than it or other wells similarly situated which were fractured according to conventional practice employing only known type propping agents, e.g. uncoated sand, glass beads, or the like.

EXAMPLE 8

This example is illustrative of the practice of the invention to inhibit passage of water through a channel in the ground. A stock watering pond having earthen sides and/or bottom is discovered to be losing water through a channel in the bottom or side. The water level is caused to subside sufficiently to expose the opening into the channel and allowed to dry. A mass of particulate discrete polymer-coated granules, wherein the polymer is adhered to the granules by an animal glue, is injected or otherwise emplaced in the channel. Upon subsequent contact with water, the polymer swells, is maintained in place as a cluster of compressed discrete particles due to the strength of the individual discontinuous centers or cores, and leakage or loss of water through the channel is substantially eliminated.

EXAMPLE 9

This example is illustrative of an embodiment of the invention wherein a subterranean formation is fractured. An oil-bearing stratum identified as the Mt. Vernon Pool, in Lincoln County, Oklahoma, required stimulation to increase oil production. It was penetrated by a well of a total depth of 4164; cased to bottom with a 7″ casing. It was known that a subjacent water zone existed and, if disturbed during fracturing by known methods, would result in undesirable water intrusion into the oil with the accompanying problems of emulsions which require wateroil separation techniques and costly handling and disposal of unwanted brine or water. The rate of production was 14 barrels of oil per day plus 2 barrels of water.

Fracturing, therefore, was carried out according to the improved method of the invention as follows:

1000 gallons of lease crude oil were pumped down the well at the rate of 3 barrels/minute together with 750 pounds of polymer-coated 20–40 mesh sand, prepared according to Example 1. Thereafter 6000 gallons of lease oil were injected at the rate of 15 barrels/minute together with 5000 pounds of 20–40 mesh uncoated sand during which fracturing occurred. Injection of lease oil continued at the rate of 15 barrels/minute but was blended with 10–20 mesh uncoated sand until 2000 more gallons of oil and 2000 more pounds of the sand had been injected, during which additional fracturing occurred. Following treatment of the well it was put back into production. It produced at a rate of 104 barrels of oil and 44 barrels of water per day. Treatment was successful because experience in fracturing oil strata in this pool theretofore had been that the water production was so stimulated by the treatment that the water production frequently exceeded oil production after treatment.

EXAMPLE 10

This example is also illustrative of the practice of the invention wherein an oil-bearing stratum having a water-bearing stratum below required stimulation. It was producing 2 barrels of oil and 20 barrels of water per day. Previous fracturing in the field, employing known propping agents had been unsuccessful since the fractures had extended into the water stratum and resulted in uneconomical water intrusion or complete loss of the well. The well was located in the Leona field in Leon County, Texas. The well was fractured by first injecting 600 pounds of 20–40 mesh sand coated with cross-linked polyacrylamide of the type employed in Examples 2 to 5, adhered to the sand with a 20% aqueous solution of casein. The so coated sand was dispersed in 1000 gallons of lease crude oil. The rate of injection of dispersion was 2 barrels per minute thereby creating initial fractures therein. Thereafter 6000 gallons of water, having suspended therein 7500 pounds of 20–40 mesh uncoated sands were injected down the well followed by 5000 gallons of water having suspended therein 5000 pounds of 10–20 mesh uncoated sand at a rate rising from 5 barrels per minute to 18.5 barrels per minute to extend the fractures. The purpose of fracturing in stages was to close off the water intrusion from the subjacent water stratum first, in accordance with the invention, and then to divert the subsequent fractures outwardly and upwardly (rather than downwardly) according to the teaching of the Braunlich application S.N. 331,524, filed Dec. 18, 1963.

Pressure was released and the well put back into production. It produced 19 barrels of oil and 35 barrels of water after treatment. Two months later it was producing 16 barrels of oil and no water per day. Since this formation had theretofore not yielded to improved oil produced without the well going to water, i.e. excessive water with negligible oil, the treatment was successful.

The results of Examples 9 and 10 show that the method of fracturing according to the invention results in improved oil production without a proportionate increase in undesired water production.

Having described our invention, what we claim and desire to protect by Letters Patent is:

1. The composition consisting essentially of a mass of discrete particles comprising hard core nuclei, an interlayer of a colloid-forming water-dispersible animal protein adhesive, and an outer coating of a particulate water-insoluble water-swellable cross-linked polymer bonded to said nuclei by said adhesive and forming an enveloping outer coating therefor, said polymer having an average particle size of not more than the average size of said nuclei.

2. The composition of claim 1 wherein said hard core nuclei are selected from particulated nut shells, wood chips, coal, ceramic, brick, perlite, rock, limestone, calcium carbonate, glass, concrete, hard resins, metal, and sand having a particle size of between about 4 and about 325 mesh.

3. The composition of claim 1 wherein said protein adhesive is casein.

4. The composition of claim 1 wherein said protein adhesive is animal glue derived from bones, hooves, and other by-product animal protein.

5. The composition of claim 1 wherein said water-swellable polymer is selected from the class consisting of polyurethanes, polyvinylmorpholinone, polyoxazolidinone, sulfonated polystyrene, sulfonated polyvinyltoluene, polyacrylic acid, copolymerized polyglycol and diisocyanate and cross-linked polyacrylamide.

6. The composition of claim 5 wherein said polymer is cross-linked polyacrylamide.

7. The composition of claim 5 wherein said polymer is a polymerized polyglycol and dissocyanate.

8. The method of inhibiting the passage of water and aqueous liquids through passageways in terranean and subterranean strata which comprises emplacing in such passageway a mass of discrete particles of a size of from about 4 to about 325 mesh, said particles consisting essentially of a water-insoluble water-swellable cross-linked polymer bonded, by means of an interlayer of a colloid-forming water-dispersible animal protein adhesive, to hard granular nuclei which provide durable cores for said particles, said particulated polymer having an average particle size not greater than the average size of said granular nuclei.

9. The method according to claim 8 wherein said discrete particles are slurried in oil prior to emplacement in said fissures, fractures, and passageways.

10. The method according to claim 8 wherein greater than atmospheric pressure is maintained on said discrete particles until at least a portion thereof has been contacted by water.

11. The method of fracturing a subterranean fluid-bearing stratum penetrated by a wellbore comprising injecting down the wellbore and into the stratum at fracturing pressures an oil having suspended therein a propping agent consisting essentially of discrete particles, of an average size of between about 4 and 200 mesh, substantially all of said discrete particles consisting essentially of a hard granular nucleus, an interlayer of a colloid-forming water-dispersible animal protein adhesive, and an outer enveloping layer of a cross-linked water-insoluble water-swellable particulated polymer bonded to said granular nuclei by the adhesive interlayer, the average size of said particulated polymer being not more than the average size of said granular nuclei.

12. The method according to claim 11 wherein said colloid-forming water-dispersible animal protein adhesive is casein.

13. The method according to claim 11 wherein the well is closed in without relieving the pressure at the wellhead to maintain pressure for a time on the emplaced polymer-coated granular nuclei.

14. The method according to claim 12 wherein a fluid loss agent is admixed with said oil prior to its entering the stratum being fractured.

15. The method according to claim 11 wherein fracturing is performed in two stages comprising (a) injecting an oil containing between about 0.25 and 10 pounds of said discrete particles per gallon to inhibit the tendency of water to enter the hydrocarbon-bearing stratum from a subjacent water stratum; (b) injecting a fluid containing a substantially non-water-swellable propping agent at fracturing pressures.

16. The method according to claim 15 wherein the rate of injection in step (b) is substantially greater than that in step (a).

References Cited

UNITED STATES PATENTS

| | | | |
|---|---|---|---|
| 2,827,121 | 3/1958 | Nowak | 166—33 X |
| 2,889,883 | 6/1959 | Santora | 166—33 |
| 2,896,717 | 7/1959 | Howard | 166—33 |
| 3,181,612 | 5/1965 | West | 166—33 |
| 3,237,693 | 3/1966 | Huitt | 166—42 |
| 3,241,613 | 3/1966 | Kern | 166—42 X |
| 3,252,904 | 5/1966 | Carpenter | 166—42 X |
| 3,281,354 | 10/1966 | Scott | 166—42 X |

CHARLES E. O'CONNELL, *Primary Examiner.*

N. C. BYERS, *Assistant Examiner.*